(12) United States Patent
Caumartin et al.

(10) Patent No.: US 9,995,064 B2
(45) Date of Patent: Jun. 12, 2018

(54) BLOCKING MECHANISM FOR PREVENTING THE OPENING OF TAIL GATES AND RELATED REAR DOORS ON LIGHT TRUCKS AND SUVS

(71) Applicants: Bernard Caumartin, Montreal (CA); Gianfranco Aiello, Montreal (CA)

(72) Inventors: Bernard Caumartin, Montreal (CA); Gianfranco Aiello, Montreal (CA)

( * ) Notice: Subject to any disclaimer, the term of this patent is extended or adjusted under 35 U.S.C. 154(b) by 0 days. days.

(21) Appl. No.: 15/585,250

(22) Filed: May 3, 2017

(65) Prior Publication Data

US 2017/0328091 A1 Nov. 16, 2017

(30) Foreign Application Priority Data

May 12, 2016 (GB) .................................. 1608395.8

(51) Int. Cl.
| | |
|---|---|
| E05B 77/44 | (2014.01) |
| E05B 83/16 | (2014.01) |
| E05B 77/46 | (2014.01) |
| E05B 83/12 | (2014.01) |
| B60R 25/01 | (2013.01) |
| E05B 67/38 | (2006.01) |
| E05B 83/18 | (2014.01) |
| E05C 19/18 | (2006.01) |
| B60J 5/10 | (2006.01) |

(52) U.S. Cl.
CPC .............. *E05B 83/16* (2013.01); *B60R 25/01* (2013.01); *E05B 67/383* (2013.01); *E05B 77/44* (2013.01); *E05B 77/46* (2013.01); *E05B 83/12* (2013.01); *E05B 83/18* (2013.01); *E05C 19/18* (2013.01); *E05C 19/184* (2013.01); *B60J 5/10* (2013.01)

(58) Field of Classification Search
CPC ........ E05B 67/38; E05B 67/383; E05B 77/00; E05B 77/28; E05B 77/283; E05B 77/44; E05B 77/46; E05B 83/08; E05B 83/12; E05B 83/16; E05B 83/20; B60R 25/01
See application file for complete search history.

(56) References Cited

U.S. PATENT DOCUMENTS

| | | | |
|---|---|---|---|
| 3,976,213 A | 8/1976 | Ball | |
| 4,630,990 A | 12/1986 | Whiting | |
| 4,819,461 A | 4/1989 | Pearson | |
| D327,043 S | 6/1992 | Ott et al. | |
| 5,154,459 A * | 10/1992 | Cochran | ................. E05C 19/18 292/205 |

(Continued)

*Primary Examiner* — Christopher J Boswell
(74) *Attorney, Agent, or Firm* — Christopher Pilling

(57) ABSTRACT

A blocking mechanism for preventing the opening of a tail gate on a vehicle having a hitch member, the blocking mechanism comprising a triangularly shaped frame having two horizontal members and two diagonal members, wherein each of the two diagonal members include an upper and lower end and each of the two horizontal members include a proximal and distal end; the lower ends of the two diagonal members are rotationally connected to a connecting bracket and the upper ends are attached to angled brackets, wherein the connecting member is attached to hitch member; the distal ends of the two horizontal members are attached to the angled brackets and the proximal ends are joined via a pair of connection elements; and a padlock is configured to lock the pair of connection elements.

9 Claims, 4 Drawing Sheets

(56) References Cited

U.S. PATENT DOCUMENTS

| | | | |
|---|---|---|---|
| 5,165,743 A * | 11/1992 | Zock | E05B 67/003 |
| | | | 292/288 |
| 5,169,042 A | 12/1992 | Ching | |
| 5,228,607 A | 7/1993 | Tolsdorf | |
| 5,294,159 A * | 3/1994 | Corrigan | E05B 65/0888 |
| | | | 292/258 |
| 5,340,172 A * | 8/1994 | Sweet | E05C 19/003 |
| | | | 292/259 R |
| 5,560,666 A | 10/1996 | Vieira et al. | |
| 5,649,656 A | 7/1997 | Davy | |
| 5,927,107 A * | 7/1999 | Mitchell | E05C 19/003 |
| | | | 292/259 R |
| 6,237,377 B1 | 5/2001 | Vasquez, Sr. | |
| 6,349,573 B1 * | 2/2002 | Johnson | B60R 25/00 |
| | | | 292/289 |
| 6,454,323 B1 * | 9/2002 | Mills | E05C 19/004 |
| | | | 16/82 |
| 6,513,852 B1 * | 2/2003 | Krist | B60J 5/108 |
| | | | 224/42.21 |
| 6,517,134 B2 | 2/2003 | Armstrong | |
| 6,564,599 B2 | 5/2003 | Eagleson et al. | |
| 6,675,615 B1 * | 1/2004 | Williams | B63J 99/00 |
| | | | 292/288 |
| 7,137,655 B2 * | 11/2006 | Quarberg | E05C 19/004 |
| | | | 16/82 |
| 7,331,623 B1 | 2/2008 | Wall et al. | |
| 8,464,460 B1 | 6/2013 | Runyan | |
| 2005/0092800 A1 | 5/2005 | Wilson | |

* cited by examiner

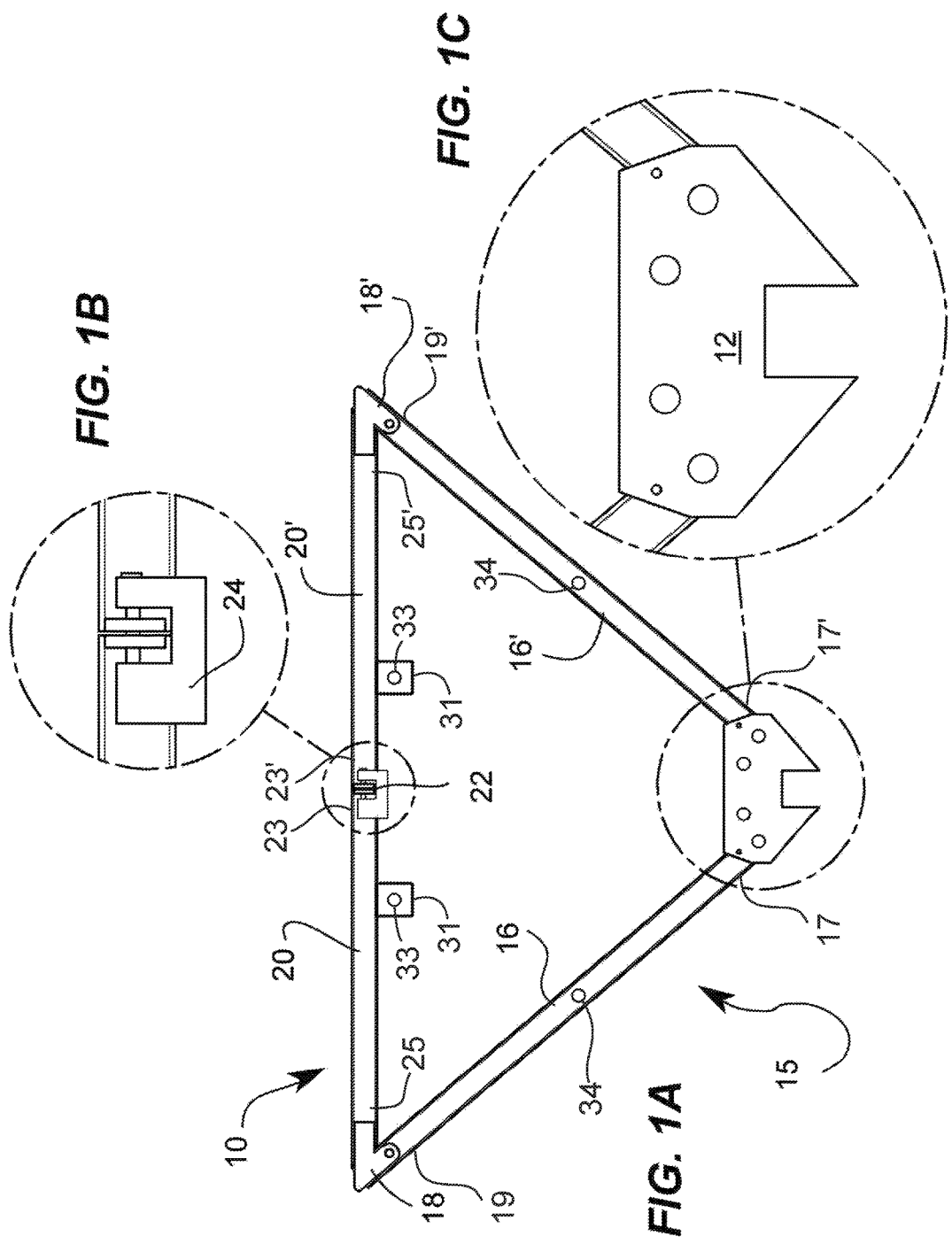

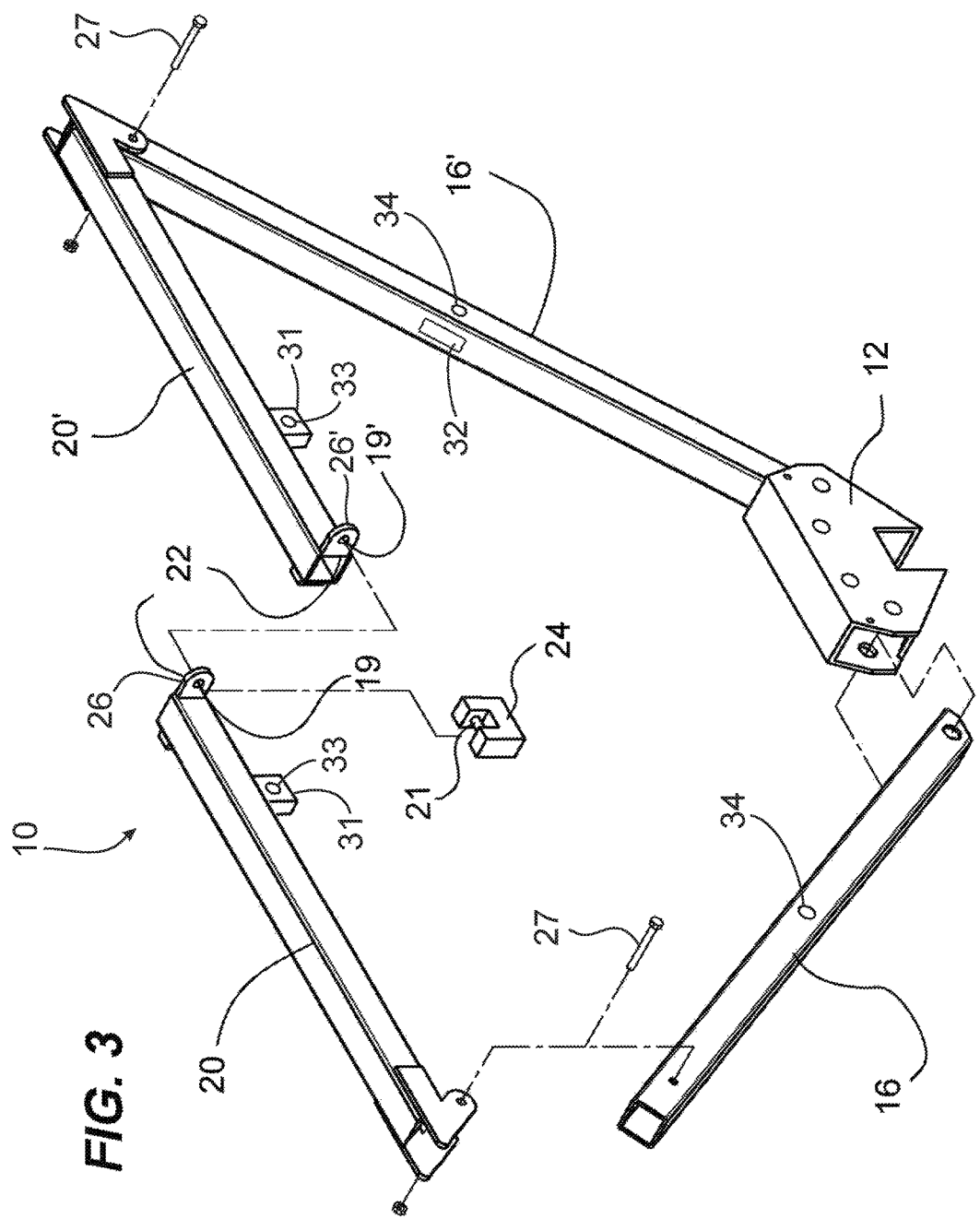

BLOCKING MECHANISM FOR PREVENTING THE OPENING OF TAIL GATES AND RELATED REAR DOORS ON LIGHT TRUCKS AND SUVS

CROSS-REFERENCE TO RELATED APPLICATIONS

The present application claims priority to Great Britain Patent Application serial number GB1608395.8, filed on May 12, 2016 entitled "Blocking Mechanism for Preventing the Opening of Tail Gates and Related Rear Doors on Light Trucks and SUVs", the disclosure of which is hereby incorporated in its entirety at least by reference.

BACKGROUND OF THE INVENTION

1. Field of the Invention

The present invention generally relates to theft prevention devices, but more particularly to blocking mechanism for preventing the opening of tail gates and related rear doors on light trucks and sport utility vehicles (SUVs).

2. Description of Related Art

Currently, there is a problem regarding the security of tail gates and rear doors on pick-up trucks and SUVs. Breaking into pick-up trucks having a cabin or SUVs having a rear opening door, such as a tail gate which opens by rotation along a horizontal axis or another type of door which opens by rotating along a vertical axis, is a situation that can occur frequently, especially to contractors and workmen who often carry expensive tools and material inside the cabin of their vehicle. Consequently, there is a need for a blocking mechanism for preventing the opening of tail gates and related rear doors on light trucks and SUVs that can dissuade potential thieves.

BRIEF SUMMARY OF THE INVENTION

In one embodiment of the present invention a blocking mechanism for preventing the opening of a tail gate on a vehicle having a hitch member is provided, the blocking mechanism comprising a triangularly shaped frame having two horizontal members and two diagonal members, wherein each of the two diagonal members include an upper and lower end and each of the two horizontal members include a proximal and distal end; the lower ends of the two diagonal members are rotationally connected to a connecting bracket and the upper ends are attached to angled brackets, wherein the connecting member is attached to hitch member; the distal ends of the two horizontal members are attached to the angled brackets and the proximal ends are joined via a pair of connection elements; and a padlock is configured to lock the pair of connection elements.

In one embodiment, each of the pair of connection elements includes a perpendicular stub member having an opening. In one embodiment, the padlock includes a pin member configured to pass through the openings locking the pair of connection elements members together. In one embodiment, the triangularly shaped frame is constructed from a heavy gauge metal of a predetermined thickness. In one embodiment, the heavy gauge metal is selected from the group consisting of galvanized steel, aluminum, and stainless steel. In another embodiment, the connecting bracket is bolted to a stub portion of the hitch member. In yet another embodiment, the connecting bracket is welded to a stub portion of the hitch member forming an integral part of the hitch member. In one embodiment, the two horizontal and the two diagonal members inhibit the tailgate from opening. In one embodiment, the two diagonal members are configured to rotate about the connecting bracket when the padlock is in an unlocked position, such that the two diagonal members are enabled to rotate at least parallel with a bumper of the vehicle allowing the tailgate to open.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 1A is a front perspective view a blocking mechanism for preventing the opening of tail gates and related rear doors on light trucks and SUVs according to an embodiment of the present invention.

FIG. 1B is a detailed view of FIG. 1A.

FIG. 1C is a detailed view of FIG. 1A.

FIG. 3 is an exploded view of a blocking mechanism for preventing the opening of tail gates and related rear doors on light trucks and SUVs according to an embodiment of the present invention.

DETAILED DESCRIPTION OF THE PREFERRED EMBODIMENT

Figure 2A:
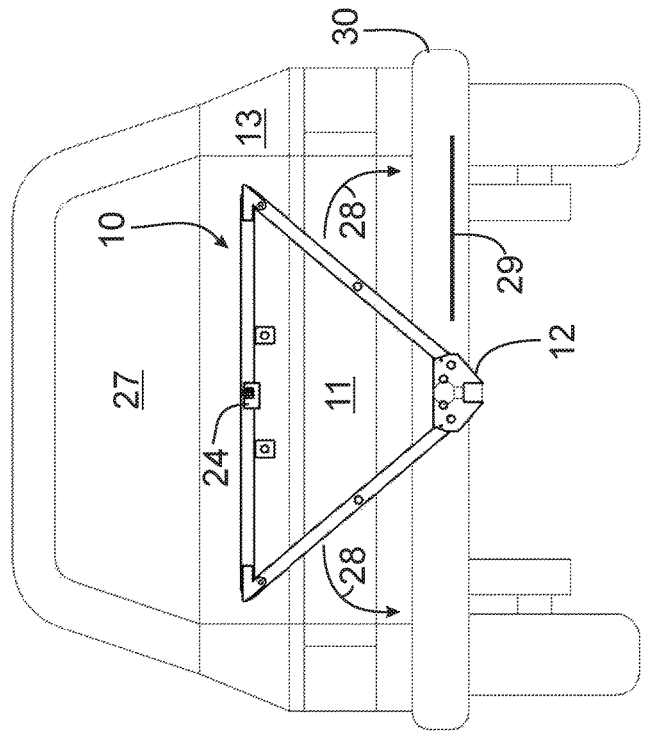
FIG. 2A is a side perspective view a blocking mechanism in use for preventing the opening of a tail gate on a vehicle according to an embodiment of the present invention.

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a blocking mechanism for preventing the opening of tail gates and related rear doors on light trucks and SUVs according to an embodiment of the present invention.

FIGS. 1-4 illustrate various views of a blocking mechanism 10 for preventing the opening of a tail gate 11 on a vehicle 13, such as a light truck or SUV. The blocking mechanism 10 comprises a triangularly shaped frame constructed from a heavy gauge metal of a predetermined thickness. The blocking mechanism 10 is exposed to an external environment, where moisture, wind, air, and in some locations salt is present. Thus, the selected metal should be corrosion resistant. In one embodiment, the metal is selected from the group consisting of galvanized steel, aluminum, and stainless steel. In alternative embodiments, another material may be used without departing from the scope of the invention. The material selected is based on a variety of factors, including but not limiting to mechanism life expectancy, cost, durability, strength, and aesthetics.

In one embodiment, the frame is comprised of two horizontal members 20 and 20', as well as two diagonal members 16 and 16', wherein the shape of the frame is visually similar in appearance to an inverted triangle. Each of the two diagonal members have a lower 17/17' and upper end 19/19', wherein the lower ends are rotationally connected to a connecting bracket 12 and the upper ends are attached to angled brackets 18 and 18'. Each of the two horizontal members have a proximal 23/23' and distal end 25/25', wherein the distal ends 25/25' are attached to the angled brackets 18 and 18' and the proximal ends 23/23' are joined via a pair of connection elements 22. Each connection element 22 comprises a perpendicular stub member 26/26' having openings 19 and 19' respectively. In one embodiment, a padlock 24 having a pin member 21 is used to join the two horizontal members 20/20'. Specifically, the openings 19/19' are lined up, at which point the pin member 21 is passed through the openings 19/19' of the connection elements 22 and locked via the padlock 24. In one embodiment, the diagonal members 17/17' may be attached to the angled brackets 18/18' via bolts 27. In one embodiment, the horizontal members 20/20' may be welded to the angled brackets 18/18'. It is a particular advantage of the present invention, that the angled brackets 18/18' provides a rotational connection between the horizontal and diagonal members, which is critical in operation. This will be discussed in further detail below.

Figure 2B:
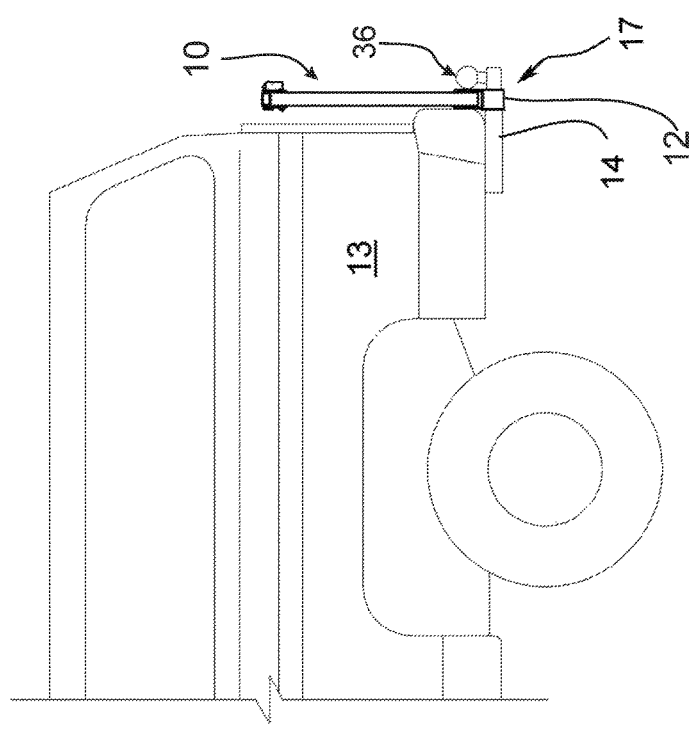
FIG. 2B is a rear perspective view a blocking mechanism in use for preventing the opening of a tail gate on a vehicle according to an embodiment of the present invention.
Figure 4:
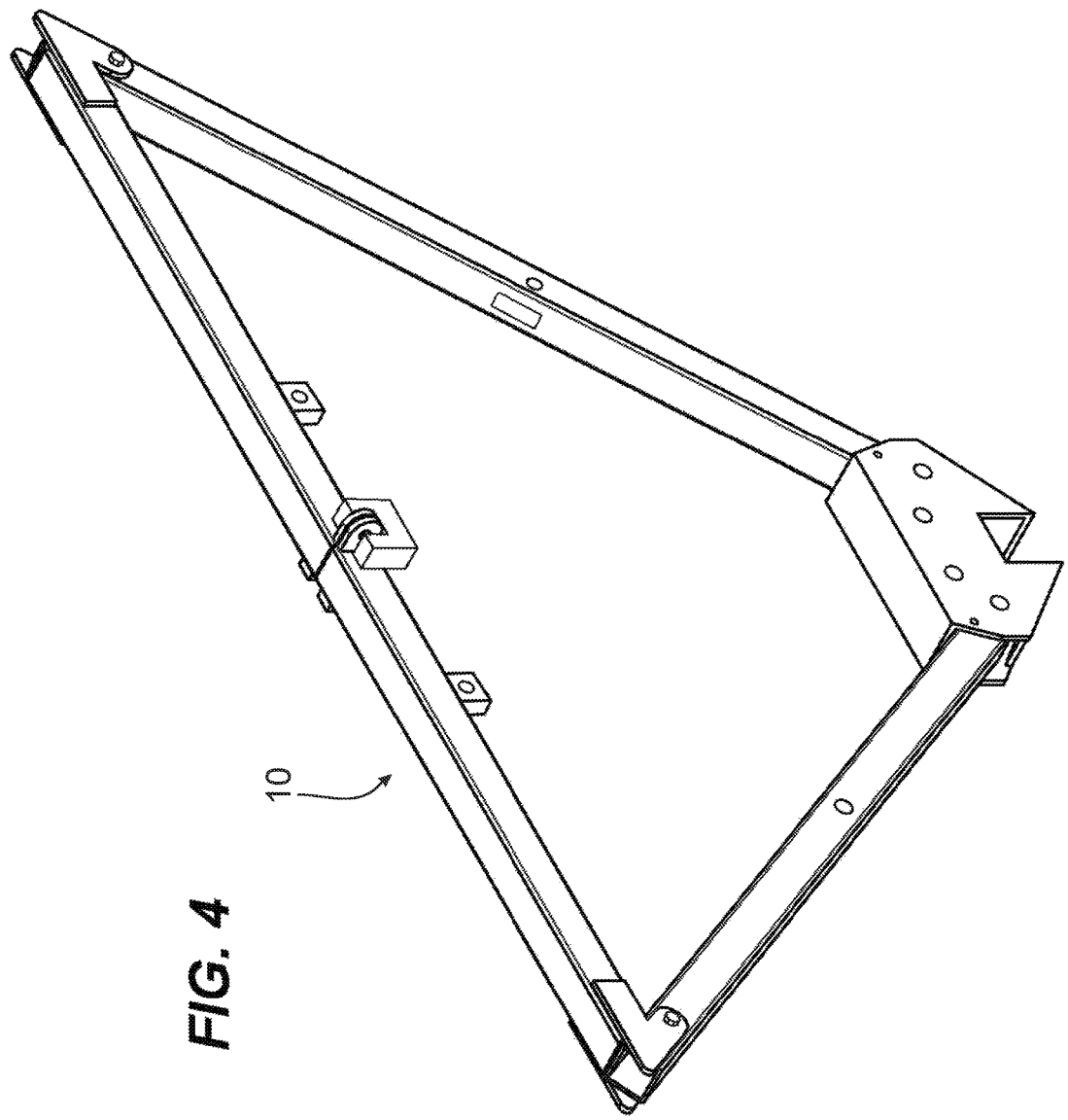
FIG. 4 is an isometric view of a blocking mechanism for preventing the opening of tail gates and related rear doors on light trucks and SUVs according to an embodiment of the present invention.

Best seen in FIGS. 2A-B, the blocking mechanism 10, and more specifically connecting bracket 12 is attached to a stub portion 14 of hitch member 17, wherein the stub portion 14 is attached to a vehicle 13, such as a light truck or SUV. In one embodiment, the connecting bracket 12 is bolted to the stub portion 14. It is important to note that the connecting bracket is not attached to hitch ball 36. In an alternative embodiment, the connecting bracket 12 is welded to the stub portion 14 forming an integral part of the hitch member 17. It is a particular advantage of the present invention, that the blocking mechanism 10 is configured to block any attempt at opening tail gate 11 on the vehicle 13, even in situations where the padlock 24 is broken or compromised. Further, the blocking mechanism 10 is configured to block any attempt at opening the tail gate 11 on the vehicle 13 even in situations where the glass 35 is broken in an attempt to break into the vehicle 13. The present invention is configured to hinder any theft attempt.

During use, when a user desires to open tail gate 11, the user simply removes the padlock 24 enabling the two diagonal members 16/16' and attached horizontal members 20/20' to rotate 28 at least parallel 29 with a rear bumper 30 of the vehicle 13, allowing the opening of the tail gate 35. In alternative embodiments, the two diagonal members 16/16' may rotate beyond parallel, allowing the opening of the tail gate 35. As previously mentioned, the angled brackets 18/18' provide a rotational connection between the horizontal 20/20' and diagonal members 18/18'. Thus, when the blocking mechanism 10 is in an unlocked position, and the padlock 24 is removed, the horizontal members 20/20' may rotate towards the diagonal members 18/18' such that an attached protruding member 31 provided on the horizontal members 20/20' may fit into slot 32 provided on the diagonal members 18/18'. The slot 32 is sized and shaped to accept the protruding member 31. This feature is also useful in transportation and/or storage. For a secured unlocked position, a bolt may be passed through holes 33 and 34, which are provided on the protruding member 31 and diagonal members 18/18' respectively.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A blocking mechanism for preventing the opening of a tail gate on a vehicle having a hitch member including a stub portion and a hitch ball, the blocking mechanism comprising:
    a triangularly shaped frame having two horizontal members and two diagonal members, wherein each of the two diagonal members include an upper and lower end and each of the two horizontal members include a proximal and distal end;
    the lower ends of the two diagonal members are rotationally connected to a connecting bracket and the upper ends are attached to angled brackets, wherein the connecting member is attached to the stub portion of the hitch member not the hitch ball;
    the distal ends of the two horizontal members are attached to the angled brackets and the proximal ends are joined via a pair of connection elements; and
    a padlock is configured to lock the pair of connection elements.

2. The blocking mechanism of claim 1, wherein each of the pair of connection elements includes a perpendicular stub member having an opening.

3. The blocking mechanism of claim 1, wherein the triangularly shaped frame is constructed from a heavy gauge metal of a predetermined thickness.

4. The blocking mechanism of claim 3, wherein the heavy gauge metal is selected from the group consisting of galvanized steel, aluminum, and stainless steel.

5. The blocking mechanism of claim 1, wherein the connecting bracket is bolted to a stub portion of the hitch member.

6. The blocking mechanism of claim 1, wherein the connecting bracket is welded to a stub portion of the hitch member forming an integral part of the hitch member.

7. The blocking mechanism of claim 1, wherein the padlock includes a pin member configured to pass through the openings locking the pair of connection elements members together.

8. The blocking mechanism of claim 7, wherein the horizontal and the two diagonal members inhibit the tailgate from opening.

9. The blocking mechanism of claim 8, wherein the two diagonal members are configured to rotate about the connecting bracket when the padlock is in an unlocked position, such that the two diagonal members are enabled to rotate at least parallel with a bumper of the vehicle allowing the tailgate to open.

\* \* \* \* \*